United States Patent
Ghilardelli et al.

[11] Patent Number: 6,016,073
[45] Date of Patent: Jan. 18, 2000

[54] BICMOS NEGATIVE CHARGE PUMP

[75] Inventors: Andrea Ghilardelli, Cinisello Balsamo; Jacopo Mulatti, Latisana; Maurizio Branchetti, San Polo D'Enza, all of Italy

[73] Assignee: SGS-Thomson Microelectronics S.r.l., Agrate Brianza, Italy

[21] Appl. No.: 08/965,068

[22] Filed: Nov. 5, 1997

[30] Foreign Application Priority Data

Nov. 14, 1996 [EP] European Pat. Off. .............. 96830581

[51] Int. Cl.[7] ....................................................... G06F 1/10
[52] U.S. Cl. ........................................... 327/536; 327/390
[58] Field of Search ................................... 327/534, 535, 327/536, 537, 589, 390

[56] References Cited

U.S. PATENT DOCUMENTS

| | | | |
|---|---|---|---|
| 5,196,996 | 3/1993 | Oh .............................................. | 363/60 |
| 5,266,842 | 11/1993 | Park ........................................ | 307/296 |
| 5,364,801 | 11/1994 | Smavling et al. ........................ | 437/39 |
| 5,412,257 | 5/1995 | Cordoba .................................. | 327/536 |
| 5,754,476 | 5/1998 | Caser et al. .............................. | 365/185 |

FOREIGN PATENT DOCUMENTS

A-0 678 970   10/1995   European Pat. Off. ......... H02M 3/07

*Primary Examiner*—Terry D. Cunningham
*Assistant Examiner*—Maria Hasanzadah
*Attorney, Agent, or Firm*—Wolf, Greenfield & Sacks, P.C.

[57] ABSTRACT

A charge pump includes a plurality of stages connected in series between a reference potential and an output terminal of the charge pump. The plurality of stages includes a first group of stages, proximate to the reference potential, and a second group of stages proximate to the output terminal of the charge pump. Each stage of the first group includes a pass-transistor with first and second terminals respectively connected to an input and an output of the stage, and a first capacitor with a first plate connected to the output of the stage and a second plate driven by a digital signal switching between the reference voltage and a positive voltage. Each stage of the second group includes a junction diode having a first electrode connected to an input of the stage and a second electrode connected to an output of the stage, and a second capacitor having a first plate connected to the output of the stage and a second plate driven by a digital signal switching between the reference voltage and the voltage supply.

34 Claims, 2 Drawing Sheets

BICMOS NEGATIVE CHARGE PUMP

BACKGROUND OF THE INVENTION

1. Field of the Invention

The present invention relates to a BiCMOS negative charge pump, particularly for integration in non-volatile memory device chips.

2. Discussion of the Related Art

Non-volatile memory devices require, for the operation of electrical erasure of the memory cells, provision of on-chip negative charge pumps capable of generating a negative voltage starting from a voltage between ground and the positive voltage supply (VDD).

A known circuit structure of a negative charge pump in CMOS technology is depicted in FIG. 1. The circuit includes a plurality of stages S1–S4 connected in series between ground and an output O of the charge pump. Each stage includes a P-channel pass-transistor M1, a P-channel pre-charge transistor M2 and two capacitors CP and CL. Capacitor CP has a plate driven by one of two phase signals A or C, capacitor CL has a plate driven by a respective phase signal B or D. The simplified timing of the phase signals A, B, C and D is depicted in FIG. 2. All the phase signals are digital signals varying between ground and a positive voltage supply, typically the voltage supply VDD of the chip wherein the charge pump is integrated. Phase signals A and D are substantially in phase with respect to each other and are substantially in phase opposition with respect to signals B and C.

When the charge pump is integrated in a non-volatile memory device chip, P-channel transistors M1, M2 are formed inside respective N type wells formed in a P type semiconductor substrate.

A positive charge flows from the output terminal O of the charge pump toward ground, and nodes P1, P2, P3, P4 acquire negative potentials. Considering one of the stages, for example stage S2, when the respective phase signal C switches from VDD to ground the pass-transistor M1 turns on. At the same time, the pass-transistors M1 in the adjacent stages are turned off by the switching of phase signal A from ground to VDD. A positive charge flows from capacitor CL of stage S2 to capacitor CL of stage S1.

In an ideal negative charge pump, the voltage at the output P1–P4 of a given stage is one VDD lower than the voltage at the output of the preceding stage (moving from left to right in FIG. 1); the higher the number of stages, the higher (in absolute value) the voltage at the output node O.

In the practice, however, since the P-channel pass-transistors M1 can have a rather high threshold voltage VTH due to the body effect, the voltage gain of each stage is limited to a value lower than –VDD.

The body effect is especially pronounced in the stages near the output terminal O of the charge pump, wherein the drain and the source electrodes of the P-channel pass-transistors M1 can be at potentials of approximately –10 V.

In order to eliminate the problems of body effect, it would be necessary to bias the N type well, wherein the P-channel pass-transistors M1 are formed, at negative voltages. However, this is not possible, because the N type well/P type substrate junction would be forward biased.

The provision of pre-charge transistors M2 and of the capacitors CP partially reduces the body effect problem, because the gate electrodes of the pass-transistors M1 are boosted to obtain gate-to-source drive voltages higher in absolute value. To this purpose, proper temporal spacing between phase signals A, B, C and D is necessary, so that precharging of the gate electrode of the pass transistors M1 takes place at different time intervals with respect to the transfer of charge from one stage to another. However, boosting of the gate electrodes of the pass-transistors is not useful after a given number of stages.

The reduced efficiency of each stage makes it necessary to provide a greater number of stages (which are less and less efficient), and the chip area occupied and the power consumption increase. Additionally, after a given number of stages, the gain of the subsequent stages becomes zero.

Another possibility calls for increasing the voltage swing of phase signals A and C (which drive capacitors CP), which instead of varying between ground and VDD should vary between ground and, e.g., 2 VDD. This solution complicates the design, because it would be necessary to provide a positive charge pump for generating the phase signals.

In view of the state of the art described, it is an object of the present invention to provide a negative charge pump which is capable of reducing or eliminating the problems related to the body effect of the pass-transistors.

SUMMARY OF THE INVENTION

According to the present invention, this and other objects are achieved by means of a charge pump comprising a plurality of stages connected in series between a reference potential and an output terminal of the charge pump, wherein said plurality of stages comprises a first group of stages proximate to said reference potential, and a second group of stages proximate to said output terminal of the charge pump, each stage of said first group comprising a pass-transistor with first and second terminals respectively connected to an input and an output of the stage, and a first capacitor with a first plate connected to said output of the stage and a second plate driven by a digital signal switching between said reference voltage and a positive voltage, each stage of the second group comprising a junction diode having a first electrode connected to an input of the stage and a second electrode connected to an output of the stage, and a second capacitor having a first plate connected to said output of the stage and a second plate driven by a digital signal switching between said reference voltage and said voltage supply.

As a result of the fact that the junction diodes have a turn-on voltage which, in contrast to the threshold voltage of transistors, is not affected by body effect problems, the voltage gain of the stages in the second group of stages (proximate to the output of the charge pump, where body effect problems would be more evident) is not reduced. As a result, this, the charge pump is more efficient, and a lower number of stages is required compared to a conventional charge pump for generating a given output voltage.

BRIEF DESCRIPTION OF THE INVENTION

The features and advantages of the present invention will be made apparent by the following detailed description of a particular embodiment thereof, described as a non-limiting example in the annexed drawings, wherein.

DETAILED DESCRIPTION

Figure 1:
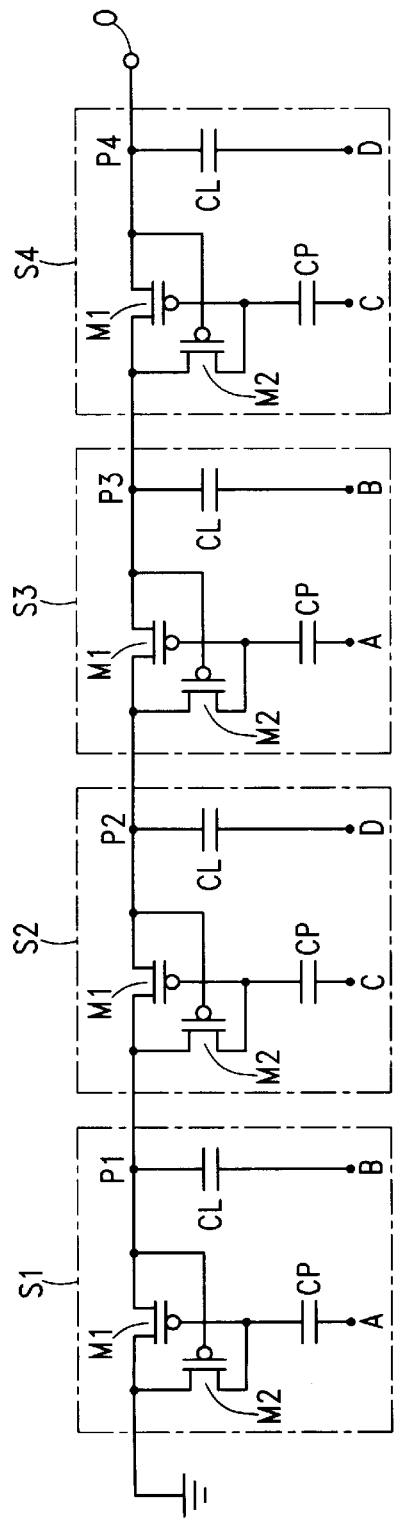
FIG. 1 is a circuit diagram of a negative charge pump according to the prior art.
Figure 2:
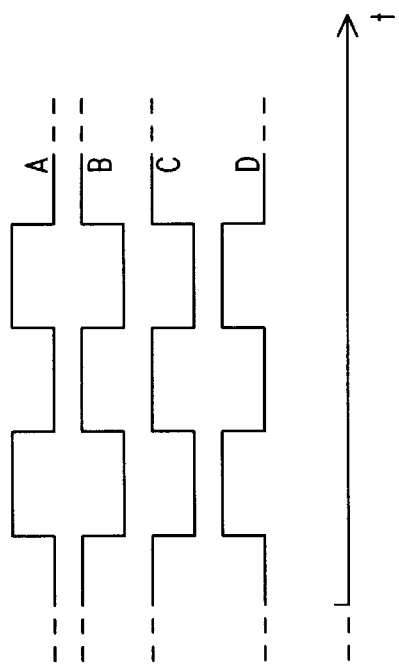
FIG. 2 is a timing diagram of drive signals of the charge pump of FIG. 1.

With reference to the drawings, FIGS. 1 and 2 respectively show a negative charge pump according to the prior art, and a timing diagram of phase signals driving the negative charge pump.

Figure 3:
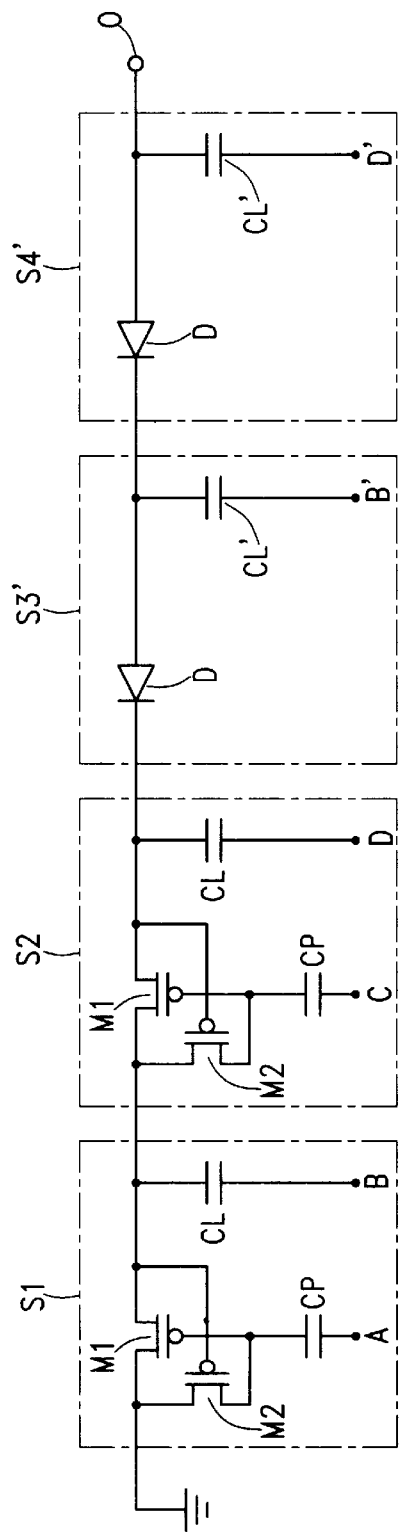
FIG. 3 is a circuit diagram of a negative charge pump according to the present invention.

FIG. 3 is a circuit diagram of a negative charge pump according to the present invention. The charge pump comprises a plurality of stages serially connected between an input terminal of the charge pump connected to ground and an output terminal O (four stages; S1, S2, S3', S4' in this example). In a first group of stages, comprising stages which are proximate to the terminal of the charge pump connected to ground (stages S1 and S2 in the shown example), conventional stages identical to those of the charge pump of FIG. 1 are used, and said stages are driven by phase signals A, B, C and D having the timing shown in FIG. 2. In a second group of stages, comprising the stages which are proximate to the output terminal O of the charge pump (stages S3' and S4' in the shown example) the stages are instead different in structure: stages S3' and S4' comprise each a junction diode D with cathode connected to the output of the preceding stage and anode connected to the input of the following stage (i.e., to the cathode of diode D in the following stage), and a capacitor CL' with one plate connected to the anode of diode D and the other plate driven by a respective phase signal B' and D'. Phase signals B' and D' are digital signals periodically switching between ground and a positive voltage supply, for example the voltage supply VDD of the chip wherein the charge pump is integrated; signal D' is in phase opposition with respect to signal B'. Signals B' and D' can be for example respectively identical to signals B and D.

With respect to the conventional charge pump shown in FIG. 1, the P-channel pass-transistors M1 in the final stages of the charge pump have been replaced by junction diodes D. The voltage gain of one of stages S3', S4' is equal to −VDD+VD, where VD is the turn-on voltage of diodes D. Since the turn-on voltage VD of a junction diode can be made lower than the threshold voltage VTH of the P-channel pass-transistors, and since the turn-on voltage VD of the junction diodes is not affected by problems of body effect, the negative charge pump of FIG. 3 is more efficient than the conventional one. Furthermore, it is possible to obtain negative output voltages which, in absolute value, are as high as desired, because for each stage like S3' or S4' added to the charge pump, an increase of |−VDD+VD| in (absolute value of) the output voltage can be achieved.

The stages which, like S1 and S2, are proximate to the input terminal of the charge pump coupled to ground are preferably of the type comprising P-channel pass-transistors and precharge transistors M2 instead of the type comprising junction diodes. In fact, in these stages the body effect on the threshold voltage VTH of the pass-transistor M1 is still small, and boosting of the gate electrode of the pass-transistors by means of M2 and CP is sufficient for obtaining a voltage gain equal to VDD (i.e., higher than that obtainable by means of a stage with a junction diode).

Another advantage of the charge pump of FIG. 3 resides in that stages S3' and S4' only comprise one capacitor each, i.e. the boosting capacitor CP is absent. In such stages it is not necessary to provide a precharge phase, so that capacitors CL can be driven by phase signals B' and D' with a higher clock rate than that of phase signals B and D driving stages S1 and S2; in this way, it is possible to increase the rate of transfer of charge between the stages, so as to compensate the loss of gain due to the voltage drop across diodes D (diode turn-on voltage VD).

Figure 4:
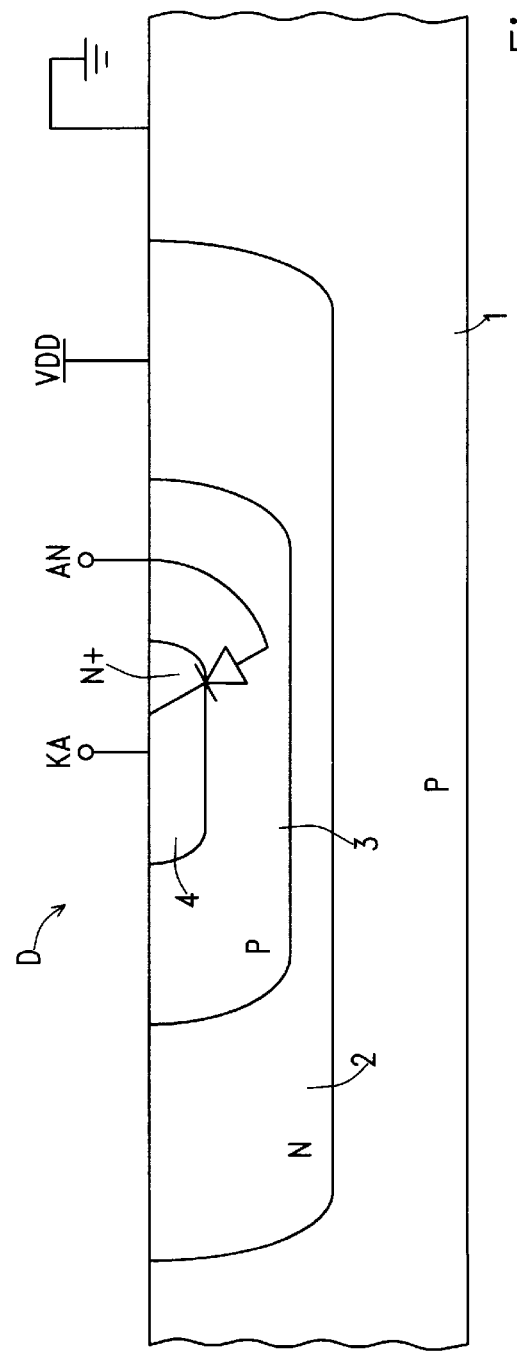
FIG. 4 is a cross-sectional view of a diode of the charge pump of FIG. 3.

FIG. 4 shows, in cross-section, a possible embodiment of the diodes D, particularly suitable in view of the integration of the charge pump in CMOS integrated devices, such as non-volatile memories. In a P type substrate 1 which represents a common substrate of the chip, an N type well 2 is formed. Inside the N type well 2, a P type well 3 is formed, and an N+ doped region 4 is formed inside the P type well 3. Region 4 forms the cathode KA, of the diode, while the P type well 3 forms the anode AN. The N type well 2 is kept biased at VDD (i.e., the more positive voltage inside the chip), while the substrate 1 is conventionally kept grounded. In this way, the P type well 3 is isolated from the P type substrate 1. This structure requires for its manufacturing a so-called "triple-well" process.

From the structure of FIG. 4, it will be appreciated that the maximum number of stages of the charge pump, i.e. the maximum negative voltage which can be generated at the output of the charge pump, is limited by the breakdown voltage of the junction between the N region 2 and the P type well 3, which is very high.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. Charge pump comprising a plurality of stages connected in series between a reference potential and an output terminal of the charge pump, wherein said plurality of stages comprises a first group of stages, proximate to said reference potential, and a second group of stages proximate to said output terminal of the charge pump, each stage of said first group comprising a pass-transistor with first and second terminals respectively connected to an input and an output of the stage, and a first capacitor with a first plate connected to said output of the stage and a second plate driven by a first digital signal switching between said reference voltage and a positive voltage, each stage of the second group comprising a junction diode having a first electrode connected to an input of the stage and a second electrode connected to an output of the stage, wherein the junction diode transfers charge from an input of the stage for an entire period of the first digital signal to an output of the stage, and a second capacitor having a first plate connected to said output of the stage and a second plate driven by a second digital signal switching between said reference voltage and said voltage supply.

2. Charge pump according to claim 1, wherein each stage of said first group of stages further comprises a precharge transistor with a first terminal connected to the input of the stage, a second terminal connected to a control electrode of the pass-transistor and a control terminal connected to the output of the stage, and a second capacitor with a first plate connected to the control electrode of the pass-transistor, and a second plate driven by a pre-charge digital signal switching between the reference voltage and the voltage supply.

3. Charge pump according to claim 2, wherein each of said junction diodes has a first electrode formed by a doped region of a first conductivity type and a second electrode formed by a first well region of a second conductivity type containing said doped region, the first well region being in turn formed inside a respective second well region of the first conductivity type formed in a semiconductor substrate of the second conductivity type.

4. Charge pump according to claim 3, wherein said first conductivity type is the N type and said second conductivity type is the P type.

5. Charge pump according to claim 4, wherein said pass-transistor and said precharge transistor are P-channel MOSFETs.

6. A charge pump comprising:
an input reference potential terminal;
an output terminal;
a plurality of digital signal switching terminals;
and a plurality of stages connected in series between said input reference potential terminal and said output terminal and responsive to digital signals on said digital signal switching terminals;
said plurality of stages comprising at least one input stage proximate to said input reference potential terminal and at least one output stage proximate to said output terminal;
said input stage comprising an input, an output, a pass-transistor connected between the input and output of the input stage, and a first capacitor connected between the output of the input stage and one of said digital signal switching terminals;
said output stage comprising an input, an output, a junction diode wherein the junction diode transfers charge from an input of the stage to an output of the stage for an entire period of the digital signals or the one of said digital signal switching terminals connected between the input and output of the output stage, and a capacitor connected between the output of the output stage and another of said digital signal switching terminals.

7. A charge pump according to claim 6 including a group of input stages.

8. A charge pump according to claim 6 including a group of output stages.

9. A charge pump according to claim 7 including a group of output stages.

10. A charge pump according to claim 9 wherein all stages of said group of input stages are substantially the same.

11. A charge pump according to claim 10 wherein all stages of said group of output stages are substantially the same.

12. A charge pump according to claim 11 wherein said pass-transistor has first and second main terminals connected respectively to the input and output of the input stage.

13. A charge pump according to claim 12 wherein said first capacitor has a first plate connected to the output of the input stage and a second plate connected to said one of said digital switching terminals for receiving a digital signal that switches between said reference voltage and a positive voltage.

14. A charge pump according to claim 13 wherein said unilateral control element comprises a junction diode.

15. A charge pump according to claim 14 wherein said junction diode has a first electrode connected to an input of the output stage, and a second electrode connected to an output of the output stage.

16. A charge pump according to claim 15 wherein the capacitor of the output stage has a first plate connected to the output of the output stage, and a second plate connected to said another of said digital signal switching terminals for receiving a digital signal that switches between said reference voltage and a positive voltage.

17. A charge pump according to claim 16 wherein each stage of said first group of stages further comprises a precharge transistor.

18. A charge pump according to claim 17 wherein said precharge transistor include a first terminal connected to the input of the input stage, and a second terminal connected to a control electrode of the pass-transistor.

19. A charge pump according to claim 18 wherein said precharge transistor also has a control terminal connected to the output of the input stage.

20. A charge pump according to claim 19 wherein said input stage also includes a second capacitor.

21. A charge pump according to claim 20 wherein said second capacitor includes a first plate connected to the control electrode of the pass-transistor, and a second plate connected to said one of said digital signal switching terminals.

22. A charge pump according to claim 21 wherein each of said junction diodes has a first electrode formed by a doped region of a first conductivity type and a second electrode formed by a first well region of a second conductivity type containing said doped region.

23. A charge pump according to claim 22 wherein said first well region is in turn formed inside a respective second well region of the first conductivity type formed in a semiconductor substrate of the second conductivity type.

24. Charge pump according to claim 23, wherein said first conductivity type is the N type and said second conductivity type is the P type.

25. Charge pump according to claim 24, wherein said pass-transistor and said precharge transistor are P-channel MOSFETs.

26. Charge pump according to claim 1, wherein the pass-transistor transfers charge from the input to the output of the input stage.

27. Charge pump according to claim 26, wherein the junction diode transfers charge from the input to the output of the output stage.

28. Charge pump according to claim 6, wherein the pass-transistor transfers charge from the input to the output of the input stage.

29. Charge pump according to claim 28, wherein the junction diode transfers charge from the input to the output of the output stage.

30. Charge pump comprising a plurality of stages connected between a reference potential and an output terminal of the charge pump, said plurality of stages comprising a first group of stages, proximate to said reference potential, and a second group of stages proximate to said output terminal of the charge pump, each stage of the first and second groups comprising a charge transfer element with first and second terminals respectively connected to a stage input terminal and a stage output terminal, the charge transfer element for transferring charge from the stage output terminal to the stage input terminal, and a capacitor with a first plate connected to the stage output terminal and a second plate driven by a respective digital signal switching between the reference voltage and a positive voltage, wherein in the stages of said first group of stages the charge transfer element includes a pass-transistor, and in the stages of said second group of stages the charge transfer element is a junction diode wherein the junction diode transfers charge from an input of the stage to an output if the stage for an entire period of the digital signal driving the capacitor in the first stage having an anode connected to the stage output terminal and a cathode connected to the stage input terminal.

31. Charge pump according to claim 30, wherein each stage of said first group of stages further comprises a precharge transistor with a first terminal connected to the input of the stage, a second terminal connected to a control electrode of the pass-transistor and a control terminal connected to the output of the stage, and a second capacitor with a first plate connected to the control electrode of the pass-transistor, and a second plate driven by a pre-charge digital signal switching between the reference voltage and the voltage supply.

32. Charge pump according to claim 31, wherein each of said junction diodes has a first electrode formed by a doped region of a first conductivity type and a second electrode formed by a first well region of a second conductivity type containing said doped region, the first well region being in turn formed inside a respective second well region of the first conductivity type formed in a semiconductor substrate of the second conductivity type.

33. Charge pump according to claim 32, wherein said first conductivity type is the N type and said second conductivity type is the P type.

34. Charge pump according to claim 33, wherein said pass-transistor and said precharge transistor are P-channel MOSFETs.

* * * * *

UNITED STATES PATENT AND TRADEMARK OFFICE
CERTIFICATE OF CORRECTION

PATENT NO. : 6,016,073
DATED : January 18, 2000
INVENTOR(S) : Andrea Ghilardelli, Jacopo Mulatti and Maurizio Branchetti It is certified that error appears in the above-identified patent and that said Letters Patent is hereby corrected as shown below:

Column 6, line 60 should read as follows:

from an input of the stage to an output of the stage for an

Signed and Sealed this

First Day of August, 2000

Attest:

Q. TODD DICKINSON

*Attesting Officer*  *Director of Patents and Trademarks*